United States Patent Office 2,927,028
Patented Mar. 1, 1960

2,927,028

IMPREGNATING LIQUIDS WITH GAS

Francis Justin Miller, Oakland, Calif.

No Drawing. Application October 30, 1957
Serial No. 693,244

1 Claim. (Cl. 99—49)

This invention relates to the impregnation of a still (i.e. substantially gas-free) wine or other liquid with carbon dioxide or other gas supplied from an external source at super-atmospheric pressure. The liquid thus impregnated is effervescent, that is to say gas will escape from the liquid when the vessel containing it is opened to the atmosphere.

Such artificial impregnation of a liquid with a gas has hitherto been carried out by bubbling the gas through the liquid, or by spraying the liquid into the gas, or by otherwise violently agitating the liquid in the presence of the gas, so as to increase as much as possible the area of surface contact between the liquid and the gas and hasten the entry of the gas into the liquid, the treatment being continued until the pressure of the gas in the liquid is substantially equal to the applied pressure. The impregnation of the liquid with gas is usually carried out in large vessels and the impregnated liquid is subsequently transferred to the bottles or other containers in which it is to be marketed, a counter-pressure of gas being maintained in these vessels while they are being filled, in order to prevent so far as possible the escape of gas from the liquid.

While it is possible by such methods to produce effervescent liquids containing gas capable of exerting a high pressure, the character or quality of the impregnation is inferior to that obtained when the gas is produced in the liquid itself by the process of fermentation, as in the well known champagne process. In particular the rate of escape of gas from the liquid when the effervescent liquid is eventually exposed to the atmosphere is much higher for an effervescent liquid than has been artificially impregnated by any of the usual methods than it is for an effervescent liquid (otherwise of the same kind and capable of exerting the same maximum pressure when agitated) produced by a process of fermentation and exposed under the same conditions of comparative stillness. On the other hand, fermentation methods are not always applicable and are relatively very expensive, taking many months to complete and usually requiring much hand labor.

The present invention provides a method of artificially impregnating a still liquid with gas supplied from an external source which gives a greatly improved quality of impregnation compared with the previously known methods of effecting such artificial impregnation. When applied to wine the new method produces a result which, so far as concerns the character of the impregnation and the avoidance of any subsequent clouding of the wine, approximates closely to the results obtainable by the champagne method of secondary fermentation.

My new process for the production of effervescent wine or other liquid by impregnating a still (i.e. substantially gas-free) liquid with carbon dioxide or other gas supplied from an external source at super-atmospheric pressure is primarily characterized by the fact that the liquid is maintained at a level of disturbance no higher than the natural level while the gas (always at a pressure greater than the pressure of the gas already in the liquid) is applied to the liquid substantially only at the exposed upper surface thereof, so that it enters the liquid substantially only through that surface, the applied gas pressure being maintained until the pressure of the gas in the liquid has increased to the desired end point pressure. (By "the natural level of disturbance" is meant that level which would be conventionally described as quiescent.)

While it is possible to carry out my process of impregnation in a large vessel, subsequently transferring the impregnated liquid to bottles or other consumer containers under counter-pressure in the known way, it is preferable to carry out the impregnation of the still liquid with gas in the bottle or other final container for the effervescent liquid, the gas being introduced through the open mouth of the container, which is stoppered or otherwise sealed when the impregnation has been completed. In this way the disturbance of the liquid which is unavoidably produced when the liquid is transferred from one vessel to another (and which is, in effect, a secondary impregnation at a high level of disturbance) is entirely avoided and the initial high quality of the impregnation is preserved substantially unchanged. Preferably the bottle or other final container is enclosed in a pressure vessel during impregnation so that the entire bottle is subjected to the gas pressure and the risk of breakage is reduced.

Before effecting impregnation with the desired gas the liquid is preferably subjected to reduced pressure in order to free it as completely as is economically possible from air and other gases present in the liquid. The removal of these gases may be accelerated by continuous or intermittent agitation of the liquid, the agitation being judiciously applied so as to avoid excessive loss of desirable constituents from the liquid. This treatment may be carried out either before or after, or both before and after, the liquid is delivered into the consumer containers.

Impregnation by my improved method requires a longer period of treatment than when the liquid is subjected to agitation during impregnation, but the period is small compared with that required for fermentation methods. The precise period required, at any given temperature, depends upon the pressure required in the finished liquid; the pressure at which the gas is applied to the liquid; the surface area of the liquid exposed to the gas and the volume of the liquid being treated.

When, as is preferred, impregnation is effected after the liquid has been delivered into the consumer container, the surface area of the liquid exposed to the gas will be dependent upon the head-space left in the container and on the shape of the container. With bottles of usual shape the exposed surface area can be extended and the diffusion of gas speeded up by holding the bottle in a tilted position.

Stoppering of the container may be carried out inside a chamber filled with the gas at the impregnating pressure, but when a liquid which has been impregnated by my improved method is exposed to the atmosphere immediately after impregnation, the initial rate of escape of the gas from the liquid is extremely low compared with the rate of escape under similar conditions from an otherwise similar liquid that has been impregnated at a high level of disturbance. It is consequently permissible in many cases, on completion of impregnation, to release the compressed gas from the head-space of the container and to seal the container at the counter-pressure of the atmosphere only. This procedure involves a very small loss of gas from the container and the admission of a little air, and the simplification of apparatus and procedure which it makes possible will in many cases outweigh this disadvantage.

The following example illustrates the carrying out of my invention, as applied to the production of effervescent wine of champagne type.

A still white wine, previously prepared by usual methods, is first freed from air and other gases as completely as is economically possible by any convenient means. For experimental purposes, the wine was treated in batches of about 3 liters in a container of about 4 liter capacity and about 8 inches in diameter at a temperature of about 15° C. The wine was subjected to an absolute pressure of about 75 mm. of mercury (i.e. about 685 mm. below atmospheric pressure) for 30 minutes, with occasional swirling agitation.

The wine is then transferred, with as little aeration as possible, into bottles of the type ordinarily used for champagne and having a capacity of about 800 milliliters. About 770 milliliters of wine is placed in each bottle, leaving a head-space unfilled with wine of about 30 milliliters. The bottles are placed upright in a rack or other holding device, which is fitted into a pressure vessel supported on a horizontal pivot. The pressure vessel is provided with means for connecting its interior either with a suction apparatus, which reduces the absolute pressure to about 75 mm. of mercury, or with a source of carbon dioxide under pressure, the pressure in this case being regulated to about 125 pounds per square inch above atmospheric pressure.

After the bottles have been placed in the pressure vessel, the latter is tilted at an angle of about 70° to the vertical and the bottles follow this movement thereby considerably increasing the area of the exposed surface of the wine in the bottles. The vessel having been closed, its interior is first connected to the suction apparatus for a period of time sufficient to substantially exhaust the air from the system. The suction line is then closed and the gas supply lines opened. The gas pressure is maintained for a period of 12 hours, the apparatus being throughout at room temperature (15° to 18° C.). During this period the wine is maintained at the natural level of disturbance, that is to say care is taken to avoid any form of positive agitation of the wine, but no special precautions are taken to protect the wine against vibrations and chance disturbances not readily controlled. However, if it should be desired to produce an even higher quality of impregnation, the pressure vessel and its contents may be specially insulated against vibrations, thereby maintaining the liquid at a level of disturbance below the natural level.

At the end of the period of impregnation, the pressure vessel is carefully returned to the vertical position; the gas supply is shut off; the pressure is reduced to atmospheric and the vessel opened. The rack is then carefully removed from the pressure vessel and the mouth of each bottle is closed with a cork or other stopper, without undue delay and with as little disturbance as possible. This last operation can be readily effected in spite of the high pressure of the gas in the wine, which in the present case is approximately equal to that of champagne produced by the usual process of secondary fermentation, i.e. the contained gas is capable of producing a pressure of about 54 pounds per square inch at 16° C. (i.e. approximately 25 p.s.i. at 0° C.) when the wine is agitated.

The time necessary to obtain the same end-point pressure can be decreased by increasing the pressure differential, or the surface area of the liquid exposed to the gas, or by decreasing the volume of the liquid. The process ceases to be operative at the point at which the gas ceases to display the properties of a gas or the liquid ceases to display the properties of a liquid.

The high quality of the impregnation obtained by the practice of the invention is well known by the behaviour of wine which for experimental purposes was impregnated to a much higher degree than in the above example. In this case the wine was impregnated at 0° C. to an end-point pressure of about 75 pounds per square inch at 0° C., yet on opening the bottle to the atmosphere immediately after impregnation there was only negligible foaming of the wine at the natural level of disturbance. If the same end-point had been obtained by the previously known positive agitation methods, intense foaming would result as soon as the bottle was opened to the atmosphere under similar conditions.

In the same way as that described in connection with wine and carbon dioxide gas, water can be impregnated with hydrogen, nitrogen, oxygen, carbon dioxide, chlorine, sulphur and other gases either singly or in combination. The advantages over prior art are as follows:

(1) The wastage of gas involved in bubbling the gas through the liquid is avoided;

(2) The desired gas content can be obtained more percisely over a wider range;

(3) Improved stability of the gas for an equivalent gas content is obtained;

(4) A higher stable gas content is possible.

The treatment of water with carbon dioxide compared with wine and carbon dioxide under the same conditions of applied pressure, temperature, exposed surface area, volume of the liquid, level of disturbance (quiescent), and time interval, results differently, as shown in the table hereunder:

| Time interval | Gauge p.s.i. of the gas in the liquid | |
|---|---|---|
| | Water | Wine |
| 6 hours | 35 | 20 |
| 12 hours | 58 | 42 |

Beer and sweetened non-alchoholic beverages occupy a place between wine and water. Other combinations also have their characteristic gas entry rate.

It will be clear from the foregoing that at any given temperature the applied pressure, the exposed surface area, the volume of liquid, the level of disturbance and the time interval may be varied infinitely to meet the needs of the case and the desires of the operator and it can be said, in view of the usefulness of a saving of time, that the pressure differential and the exposed surface area should be as great as practicable to offset the disadvantage in speed brought about by maintaining the liquid in a quiescent condition.

This application contains subject matter in common with my application Serial No. 372,402, filed August 4, 1953, and is to be considered as a continuation-in-part of the latter.

I claim:

A method of impregnating an aqueous liquid with a gas supplied solely from an external source to form a liquid-gas system and to preserve the resulting stability potential which comprises establishing in a stopperable processing vessel a body of the aqueous liquid leaving above the liquid a headspace unfilled with liquid; filling the headspace with the gas at a pressure greater than the pressure of the gas in the liquid in such a manner that the liquid and gas are in a closed system; maintaining the liquid in a quiescent condition so that the gas enters the liquid substantially only through the upper surface of the liquid exposed to the headspace while maintaining a greater gas pressure in the headspace than the pressure of the gas in the liquid until the process of impregnation is terminated prior to equilibrium of the existing liquid-gas system by unstoppering the vessel so that the pressure of the gas in the headspace is reduced to a value not greater than the pressure of the gas in the liquid and then re-stoppering the processing vessel containing the impregnated aforesaid body of aqueous liquid.

References Cited in the file of this patent

UNITED STATES PATENTS

| | | |
|---|---|---|
| 2,356,498 | Bargeboer | Aug. 22, 1944 |
| 2,584,183 | Blumauer | Feb. 5, 1952 |
| 2,672,420 | Jeremiah | Mar. 16, 1954 |